United States Patent
George et al.

(10) Patent No.: US 6,338,742 B1
(45) Date of Patent: Jan. 15, 2002

(54) CRYSTALLIZATION PROCESS

(75) Inventors: Neil George; Stephen Dawson; William Malcolm Logan Wood, all of Huddersfield (GB)

(73) Assignee: Syngenta Limited, Surrey (GB)

( * ) Notice: Subject to any disclaimer, the term of this patent is extended or adjusted under 35 U.S.C. 154(b) by 0 days.

(21) Appl. No.: 09/308,741

(22) PCT Filed: Oct. 23, 1997

(86) PCT No.: PCT/GB97/02927

§ 371 Date: May 24, 1999

§ 102(e) Date: May 24, 1999

(87) PCT Pub. No.: WO98/23350

PCT Pub. Date: Jun. 4, 1998

(30) Foreign Application Priority Data

Nov. 26, 1996 (GB) ............................................. 9624615

(51) Int. Cl.⁷ ................................................. B01D 9/00
(52) U.S. Cl. ..................................................... 23/295 R
(58) Field of Search ........................... 23/293 R, 295 R

(56) References Cited

U.S. PATENT DOCUMENTS

| 3,939,260 A | 2/1976 | Lafon ........................... 424/28 |
| 4,330,456 A | 5/1982 | Bonnaud et al. ............... 524/46 |
| 4,880,634 A | 11/1989 | Speiser ........................ 424/450 |
| 5,147,412 A | 9/1992 | Klinksiek et al. ......... 23/293 R |
| 5,471,001 A | 11/1995 | Anderson et al. ............ 562/593 |

FOREIGN PATENT DOCUMENTS

| EP | 0 221 465 | 10/1986 |
| EP | 0 278 595 A2 | 8/1988 |
| EP | 0 562 391 A1 | 9/1993 |
| GB | 1 569 288 | 6/1980 |
| JP | 01228502 | 9/1989 |
| JP | 1228502 | * 9/1989 |
| WO | 92/20420 | 11/1992 |
| WO | 94/20072 | 9/1994 |

* cited by examiner

*Primary Examiner*—Steven P. Griffin
*Assistant Examiner*—Eileen E. Nave
(74) *Attorney, Agent, or Firm*—Hale and Dorr LLP

(57) ABSTRACT

A process for preparing a crystal suspension of an organic compound which has a $\Delta H/RT$ value greater than 10, the process comprising dispersing a melt of the organic compound in a liquid dispersion medium to form an emulsion, cooling the emulsion below the melting point of the organic compound and subjecting the emulsion to ultrasonic vibration.

18 Claims, No Drawings

CRYSTALLIZATION PROCESS

This invention relates to a crystallisation process and, in particular, to a process for producing a crystalline suspension of an organic compound in a liquid medium.

In the agrochemical industry, pesticides are often supplied in the form of suspension concentrates. These comprise a largely insoluble, particulate active ingredient suspended in a liquid medium, usually an aqueous medium. They are commonly prepared by ball or bead milling a millbase consisting of the active ingredient, liquid medium and one or more dispersing agents, and then formulated with additives and a volume-adjusting amount of the liquid medium. Additives may include, for example, antisettling or suspension agents, preservatives, antifoams, antifreezes and biological adjuvants.

It is important to the industry to be able to provide fluid, storage stable concentrates without the need for stirred storage vessels or the use of thickeners to maintain the solid particles in suspension. A key factor in obtaining a physically stable product is the particle size of the suspended solid. Normally, the smaller the particle size, the more stable is the suspension.

Milling is a common technique for reducing the particle size of a suspended solid, but may not always produce the best results, and, because it generates considerable heat, may not always be appropriate, for example, where the active ingredient is a low melting solid.

An alternative technique is to crystallise the solid from an emulsion of the melted solid, or a solution of it, in the liquid medium. For example, it is known from EP-A-0221465 to prepare suspensions by dispersing a melt above its solidification temperature in an aqueous phase and allowing the melt to solidify by cooling it below its crystallisation temperature. It is also known from DE-A-2551841 and DE-A-2900268 that a melt can be dispersed in an aqueous phase having a temperature below the solidification temperature of the melt. Dispersions of this type are produced using high speed stirrers or rotor-stator machines. The disadvantage of these processes is that they tend to give only coarse dispersions with short shelf lives, although finer dispersions may be obtained if, as described in EP-A-0399266, the initial emulsion is subjected to an additional homogenisation step.

In these emulsions, the melt is suspended in the aqueous phase in the form of droplets. If the droplets crystallise rapidly, the crystal size distribution will be the same as the original droplet size within the emulsion. Therefore, in theory, it should be possible to generate finer and more stable dispersions by reducing the droplet size. However, as the droplet size decreases, crystallisation becomes slower. Furthermore, the solubility of the droplet in the continuous phase increases with decreasing droplet size, due to higher pressures within the droplet. The effect of this is that the continuous phase concentration can rise to a level where it becomes supersaturated relative to the crystalline form, with the result that nucleation and crystal growth occurs in the continuous phase. As nucleation rates tend to be slow in the continuous phase, large crystals are generated which bear no resemblance to the original droplets. This is clearly undesirable if fine dispersions are to be obtained.

The use of ultrasound for crystallising melts and solutions is well known. For example, a process for the crystallisation of adipic acid from aqueous solution is known from U.S. Pat. No. 5,471,001. It is also known to use ultrasonics for preparing emulsions and fine droplet dispersions (see, for example, WO-A-94/20072). It has now been found that ultrasound can be used to generate finer particle size, more stable dispersions from emulsions.

Thus, according to the present invention there is provided a process for preparing a crystalline suspension of an organic compound which has a $\Delta H/RT$ value greater than 10, the process comprising dispersing a melt of the organic compound in a liquid dispersion medium to form an emulsion, cooling the emulsion below the melting point of the organic compound and subjecting the emulsion to ultrasonic vibration.

The value $\Delta H/RT$ is a well understood expression which means the enthalpy (heat) of fusion of a compound ($\Delta H$ in $kJmol^{-1}$) at the normal melting point of the compound divided by the molar gas constant (R, where R is 8.31451 $Jmol^{-1}K^{-1}$) and the melting point of the compound measured on the absolute or Kelvin scale (in ° K). Thus, for example, the $\Delta H/RT$ value of octadecane, which has a melting point of 28.2° C. and a heat of fusion of 61.39 $kJmol^{-1}$ (see the *CRC Handbook of Chemistry and Physics*, [1996–1997], 77$^{th}$ Edition, 6–138) is calculated as follows:

$$61.39/8.31451 \times 10^{-3} \times (28.2+273.16)=24.5$$

The heat of fusion of a compound ($\Delta H$) may be measured by differential scanning calorimetry. A suitable method is described by McNaughton, J. L. and Mortimer, C. T. in IRS: Physical Chemistry Series 2, Butterworth, London 1975, Vol 10; subsequently reprinted by Perkin-Elmer Corpn. Norwalk, Conn., USA.

The invention is of particular interest in the formulation of low melting agrochemicals, especially pesticides such as fungicides, insecticides and herbicides, as suspension concentrates. It will be evident, however, that the process is equally applicable to the preparation of a crystalline suspension of any other low melting organic compound. Where the crystalline suspension is to be stored for long periods at ambient temperature, it is desirable that the organic compound has a melting point above 20° C. and, preferably, above 30° C. However, the melting point should not be higher than the boiling point of the chosen liquid medium dispersion medium at its operating pressure. This pressure will be as high as it is reasonably practicable or economical to pressurize the apparatus being used. Thus, where the liquid medium is water, as will normally be the case, the organic compound may have a melting point of from 20° C. to 200° C., the upper temperature being possible where the apparatus is pressurized to around 14 bar. Suitably the organic compound will have a melting point of from 20° C. to 120° C. for example, from 30° C. to 100° C. and, typically, from 40° C. to 90° C.

The liquid dispersion medium, which may be any suitable liquid, for example, water or an agriculturally acceptable organic solvent that is benign to living tissue, will ideally have a crystallisation point of at least 10° C., suitably 20° C., below the crystallisation point of the organic compound, and a boiling point of at least the same order as the melting point of the organic compound, and preferably at least 5° C. above the melting point of the organic compound, for example, from 10° C. to 30° C. above. Of most interest, however, are those suspensions where the liquid dispersion medium is an aqueous medium and where the emulsion formed is an oil-in-water emulsion.

Conveniently, the organic compound is melted and heated to a temperature slightly above its melting point, for example 5° C. to 10° C. above, and added to the liquid dispersion medium heated to approximately the same temperature as the melt, ie within 5° C. or so. Alternatively, the organic compound may be added to the liquid medium at a temperature above or below the melting point of the organic compound, for example prior to heating to the melt temperature, and the temperature adjusted until the organic compound has melted.

Depending on the crystallisation properties of the organic compound, it may also be possible to add the melt to the liquid medium at a temperature below the melting point of the organic compound without further heating.

The concentration of the organic compound in the liquid dispersion medium will be up to 60% w/w, normally from 20% w/w to 60% w/w, for example, from 30% w/w to 50% w/w, and typically around 40% w/w.

The liquid medium may contain additives, for example one or more dispersing agents, or other additives of the type normally used in the preparation of crystalline suspensions and which are well documented in the literature.

The liquid medium containing the melt or solution is vigorously agitated using, for example, a high shear mixer or homogeniser or a combination of these, to generate the desired droplet size of the suspended organic compound. Generally, droplet sizes of less than 10 $\mu$m (mean diameter), for example between 1 $\mu$m and 10 $\mu$m and preferably between 1 $\mu$m and 5 $\mu$m, are required, but the present invention is also applicable to sub-micron droplets.

The emulsion so formed is cooled, preferably as rapidly as possible, to a temperature below the melting point of the organic compound, suitably to a temperature of from 1° C. to 80° C., depending on the melting point of the organic compound and the nature of the liquid dispersion medium. For a compound with a melting point of, for instance, 70° C. to 80° C. and where the liquid dispersion medium is water, the emulsion may be cooled from 30° C. to 70° C., for example from 50° C. to 60° C., below the melting point of the organic compound. For a compound with a melting point of, for instance, 20° C. to 40° C., the emulsion may be cooled from 1° C. to 20° C., for example from 3° C. to 10° C., below the melting point of the organic compound. After cooling, ultrasonic vibration is applied until crystallisation has progressed to an acceptable degree.

Any suitable source of ultrasonic vibration may be used. A half-inch diameter (12.7 mm) ultrasonic probe operating at 20 kHz and a power input of 100 watts has been found convenient, but there will be many other commercially available devices equally suitable.

The invention is of particular interest for preparing a crystalline suspension of the fungicide methyl (E)-2-{2-[6-(trifluoromethyl)pyridin-2-yloxymethyl}phenyl]-3-methoxyacrylate (EP-A-0278595; compound No. 177, Table I) and a eutectic mixture of this compound with the fungicide azoxystrobin (methyl (E)-2-{2-[6-(2-cyanophenoxy)pyrimidin-4-yloxy]phenyl}-3-methoxyacrylate). It may, however, be used for other low melting agrochemical compounds and, indeed, for any other low melting organic compound with a suitable $\Delta H/RT$ value, such as a $C_{16}$ to $C_{20}$ saturated aliphatic hydrocarbon, for example, hexadecane, octadecane, nonadecane or eicosane, or a $C_{12}$ to $C_{16}$ saturated fatty acid, for example, tetradecanoic acid.

The invention is illustrated by the following Examples in which the compound A is methyl (E)-2-{2-[6-(trifluoromethyl)pyridin-2-yloxymethyl]phenyl)-3-methoxyacrylate having a melting point 76° C. and a $\Delta H/RT$ value of 10.55, and Morwet D425* which is an anionic naphthalene sulphonic acid-formaldehyde condensate, and Atlox 4913* which is a non-ionic polymethacrylate, are both used as dispersing agents. The following abbreviations are used throughout:

| g = grammes | % w/w = percent weight by weight | ° C. = degrees centigrade |
| mm = millimeters | $\mu$m = micrometers | kHz = kiloHertz |
| w = watts | mp = melting point | $\Delta H$ = heat of fusion (kJmol$^{-1}$) |
| R = molar gas constant (8.31451 Jmol$^{-1}$k$^{-1}$) | | T = temperature in degrees Kelvin |

EXAMPLE 1

A melt of compound A (100 g) at 80° C. was added to water (150 g) at 80° C. containing Morwet D425 (0.3% w/w of the total formulation) and Atlox 4913 (4.8% w/w of the total formulation). The water with added melt was agitated vigorously using a Silverson high shear mixer. A dispersion containing droplets of 5–10 $\mu$m (average diameter) was generated. The dispersion was cooled rapidly (within 5 minutes) to 20° C. in a jacketed vessel. A 12 mm ultrasonic probe (obtained from Heat Systems Ultrasonics Inc) operating at 20 kHz and at a power input of 100 w, was submersed in the dispersion and sonication applied for 30 minutes. The rate of crystallisation was followed by microscopic observation under cross-polars.

By comparison with a dispersion prepared and processed in the same way, but without sonication, the use of ultrasound was shown to increase the nucleation rate within the dispersed melt droplets. This was apparent from the following observations:

1. The time to crystallise the whole dispersion was reduced from 1 hour to 10 minutes using ultrasound.
2. The crystal size distribution of the sonicated dispersion corresponded more closely to the droplet size distribution of the original emulsion.
3. Scanning Electron Microscopy confirmed that all the droplets of the sonicated dispersion had crystallised. The resulting particles were roughly spherical and comprised mainly individual intergrown crystals. Although some droplets of the non-sonicated dispersion crystallised, the crystal number per droplet was lower and some large, flat crystals were formed.

EXAMPLE 2

A dispersion was prepared in exactly the same way as in Example 1, except that the water with added melt was homogenised using a Niro-Soavi valve homogeniser set at 50 bar, instead of being agitated using a Silverson high shear mixer. This generated a melt dispersion with droplets of the order of 3 $\mu$m. Sonication produced a fluid dispersion of 3 $\mu$m diameter spherical crystals which appeared to be porous (high surface area).

By comparison, a dispersion prepared and processed in exactly the same way, but without sonication, produced a solidified dispersion of flat crystals that were much larger than the original droplets. These had crystallised from the continuous aqueous phase.

EXAMPLE 3

A eutectic mixture of compound A 75% w/w and azoxystrobin (mp 121° C., $\Delta H/RT$ 11.64) 25% w/w was prepared and melted at 95° C. This mixture was homogenised (Soavi high pressure homogeniser) at 50 bar with 2.4% w/w Morwet D425 and 4.8% w/w Atlox 4913 to form droplets of around 2 $\mu$m in size. On cooling to 40° C. crystallisation occurred in the continuous phase in the absence of sonication. In the presence of sonication the droplets could be seen to crystallise within minutes, generating diamond shaped crystals in equal numbers to the droplets.

EXAMPLES 4 TO 7

Hexadecane ($C_{16}H_{34}$, mp 20° C.), Octadecane ($C_{18}H_{38}$, mp 28° C., $\Delta H/RT$ 24.52), Nonadecane ($C_{19}H_{40}$, mp 32° C., $\Delta H/RT=18.06$) and Eicoasane ($C_{20}H_{42}$, mp 36° C. $\Delta H/RT=27.13$).

These compounds were all emulsified (at 20% w/w oil phase) with Tween 20 (2% w/w above their melting points using a Silverson mixer. This gave droplets of the order of 5–10 μm. On cooling to 10° C., 20° C., 29° C., and 30° C., respectively, all crystallised slowly in droplets. On sonication, however, the droplets crystallised within 90 sec for hexadecane, 15 sec for octadecane, 25 sec for nonadecane and 30 sec for eicosane. Clearly, the nucleation rate of these droplets was greatly enhanced, indicating that smaller crystalline droplets could be produced.

EXAMPLE 8

Tetradecanoic Acid ($C_{14}H_{28}O_2$, mp 54° C., $\Delta H/RT=16.69$)

A 4% w/w dispersion was emulsified with 0.4% Span 20 and 1% w/w Mowiol 8-88 using a Silverson mixer. These 5 μm droplets also crystallised rapidly on cooling to 46° C. but it was noticeable under the microscope that in the presence of sonication the crystallisation rate within the droplets increased (crystallised within 10 sec).

What is claimed is:

1. A process for preparing a crystal suspension of an organic compound which has a $\Delta H/RT$ value greater than 10, the process comprising dispersing a melt of the organic compound in a liquid dispersion medium to form an emulsion, cooling the emulsion below the melting point of the organic compound and subjecting the emulsion to ultrasonic vibration.

2. A process according to claim 1 in which the organic compound has a melting point above 20° C.

3. A process according to claim 1 in which the organic compound has a melting point between 30° C. and 100° C.

4. A process according to claim 1 in which the liquid dispersion medium has a crystallisation point of at least 10° C. below the melting point of the organic compound and a boiling point of at least the same order as the melting point of the organic compound.

5. A process according to claim 1 in which the liquid dispersion medium is an aqueous medium.

6. A process according to claim 3 in which the emulsion formed is an oil-in-water emulsion.

7. A process according to claim 1 in which the melt is added to the liquid dispersion medium while the liquid dispersion medium is at approximately the same temperature as the melt.

8. A process according to claim 1 in which the melt of the organic compound is dispersed in the liquid dispersion medium using a high shear mixer.

9. A process according to claim 1 in which the melt of the organic compound is dispersed in the liquid dispersion medium using a homogeniser.

10. A process according to claim 1 in which the organic compound is dispersed in the liquid dispersion medium in the form of droplets having a mean diameter of from between 1 μm to 10 μm.

11. A process according to claim 1 in which the emulsion is rapidly cooled to a temperature of from 10° C. to 80° C. below the melting point of the organic compound.

12. A process according to claim 1 in which the organic compound is methyl (E)-2-[2-[6-(trifluoromethyl)pyridin-2-yloxymethyl]phenyl)-3-methoxyacrylate.

13. The process according to claim 1, wherein the organic compound is dispersed in the liquid dispersion medium at a concentration of up to 60% w/w.

14. The process according to claim 13, wherein the organic compound is dispersed in the liquid dispersion medium at a concentration from 20% w/w to 60% w/w.

15. The process according to claim 1, wherein the liquid dispersion medium comprises one or more dispersing agents.

16. The process according to claim 10, wherein the organic compound is dispersed in the liquid dispersion medium in the form of droplets having a mean diameter between 1 μm to 5 μm.

17. The process according to claim 1, comprising cooling the emulsion to a temperature from 1° C. to 80° C. below the melting point of the organic compound.

18. The process according to claim 1, wherein the organic compound is a eutectic mixture of methyl (E)-2-{2-[6-(trifluoromethyl)pyridin-2-yloxymethyl]phenyl)-3-methoxyacrylate and azoxystrobin.

* * * * *